(12) United States Patent
Göbelt et al.

(10) Patent No.: US 7,851,544 B2
(45) Date of Patent: Dec. 14, 2010

(54) COPOLYMERS COMPRISING THREE SEGMENTS OF DIFFERENT ION DENSITY, PROCESSES FOR PREPARING THEM AND USE THEREOF

(75) Inventors: Bernd Göbelt, Wesel (DE); Jürgen Omeis, Dorsten-Lembeck (DE); Sabine Johann, Oberhausen (DE)

(73) Assignee: BYK-Chemie GmbH (DE)

( * ) Notice: Subject to any disclaimer, the term of this patent is extended or adjusted under 35 U.S.C. 154(b) by 1016 days.

(21) Appl. No.: 11/649,333

(22) Filed: Jan. 3, 2007

(65) Prior Publication Data
US 2007/0185272 A1 Aug. 9, 2007

(30) Foreign Application Priority Data
Jan. 3, 2006 (DE) .................. 10 2006 000 807

(51) Int. Cl.
*C08L 31/00* (2006.01)

(52) U.S. Cl. .................. 524/555; 524/556; 526/79; 526/310; 526/317.1; 526/318

(58) Field of Classification Search .................. 524/555, 524/556; 526/79, 310, 317.1, 318
See application file for complete search history.

(56) References Cited

FOREIGN PATENT DOCUMENTS

WO WO-2005/103102 A2 11/2005

*Primary Examiner*—Edward J Cain
(74) *Attorney, Agent, or Firm*—Schwegman, Lundberg & Woessner, P.A.

(57) ABSTRACT

The invention relates to copolymers comprising three segments of different ion density, the fraction of the ionic monomers in each segment being from 1 to 100 mol %, the second and third segment containing ethylenically unsaturated monomers of the respectively preceding segment, and the copolymers being preparable by means of a monofunctional initiator by way of NMP or RAFT. The invention further relates to a process for preparing copolymers and to their use as dispersants.

23 Claims, No Drawings

COPOLYMERS COMPRISING THREE SEGMENTS OF DIFFERENT ION DENSITY, PROCESSES FOR PREPARING THEM AND USE THEREOF

RELATED APPLICATION

This application claims priority under 35 U.S.C. 119 to German Application No. 10 2006 000 807.3, filed Jan. 3, 2006, which application is incorporated herein by reference and made a part hereof.

The invention relates to copolymers comprising three segments of different ion density, to a process for preparing them and to their use, in particular as dispersants, for treating pigments, and as an additive in coating materials and moulding compounds.

Recent years have seen the development of various living, controlled polymerization processes suited to the preparation of block copolymers. These processes include, for example, Reversible Addition Fragmentation Chain Transfer (RAFT), which when using certain polymerization regulators is also called MADIX and Addition Fragmentation Chain Transfer, but will be referred to here only as RAFT, as described for example in Polym. Int. 2000, 49, 993, Aust. J. Chem. 2005, 58, 379, J. Polym. Sci. Part A: Polym. Chem. 2005, 43, 5347, U.S. Pat. No. 6,291,620, WO 98/01478, WO 98/58974 and WO 99/31144, controlled polymerization with nitroxyl compounds as polymerization regulators (NMP), as disclosed for example in Chem. Rev. 2001, 101, 3661, Atom Transfer Radical Polymerization (ATRP), as described for example in Chem. Rev. 2001, 101, 2921, Group Transfer Polymerization (GTP) as disclosed for example by O. W. Webster in "Group Transfer Polymerization", in "Encyclopedia of Polymer Science and Engineering", Volume 7, H. F. Mark, N. M. Bikales, C. G. Overberger and G. Menges, Eds., Wiley Interscience, New York 1987, page 580 ff., controlled free-radical polymerization with tetraphenylethane, as described for example in Macromol. Symp. 1996, 111, 63, controlled free-radical polymerization with 1,1-diphenylethene as polymerization regulator, as described for example in Macromolecular Rapid Communications, 2001, 22, 700, controlled free-radical polymerization with iniferters, as disclosed for example in Makromol. Chem. Rapid Commun. 1982, 3, 127, and controlled free-radical polymerization with organocobalt complexes, as is known for example from J. Am. Chem. Soc. 1994, 116, 7973.

The block copolymers obtained with polymerization processes of this kind can frequently be used as wetting agents and dispersants.

OPI documents WO 00/40630 and WO 03/046029 describe pigment preparations with AB and ABA block copolymers which also contain ionic groups in all polymer blocks and which are prepared by ATRP. A disadvantage of that polymerization technology is the incomplete removal of the requisite metal catalysts, such as amine complexes of copper halide compounds, for example. This removal is particularly difficult in the case of polymers which include polar monomers, such as amine-containing, acid-containing or ionic monomers. The remanence of the catalyst in the polymer solution causes an unwanted green or blue coloration of the polymer solution and a more rapid decomposition of the polymers as a result of degradation reactions catalysed by the remanent catalyst or its successor products, and is therefore unwanted.

EP 1 275 689 describes pigment preparations with diblock copolymers which comprise a polymer block with ionic groups and a polymer block free from ionic groups and are prepared by NMP. In various media the block copolymers described in EP 1 275 689 tend to form micelles, which results in pigments or other solids being dispersed more slowly or not at all. Furthermore, the block copolymers described in that document show a very limited compatibility with different types of binder, such as polyester binders, for example, which severely restricts their use as wetting agents and dispersants.

The object, then, was to provide copolymers, and to construct them in such a way that they are not hampered by the above-described disadvantages of a cleaning step after the reaction, and combine very good dispersing of the pigments with a broad compatibility towards binders.

This object has been achieved by the provision of copolymers comprising three segments of different ion density, the fraction of the ionic monomers in each segment being from 1 to 100 mol %, the second and third segment containing ethylenically unsaturated monomers of the respectively preceding segment, and the copolymers being preparable by means of a monofunctional initiator by way of NMP or RAFT, wherein the polymerization of the first segment takes place up to a degree of conversion of 10 to 95 mol % of the monomer or monomer mixture employed, the polymerization of the second segment onto the first segment takes place with inclusion of the unreacted monomers of the first segment and of a monomer or monomer mixture which differs from the monomer or monomer mixture of the first segment at least in the amount of ionic monomers or ionic monomer precursors employed, the polymerization of the second segment taking place up to a degree of conversion of 10 to 95 mol % of the monomers available for reaction, and the polymerization of the third segment onto the second segment takes place with inclusion of the unreacted monomers of the second segment and, where appropriate, first segment and of a monomer or monomer mixture which differs from the monomer or monomer mixture of the second segment at least in the amount of ionic monomers or ionic monomer precursors employed, and the ionic monomer precursors, where used, are converted wholly or partly into ionic monomers.

The monomers of a segment are of course present in copolymerized form in that segment.

The ion density is defined as follows:

$$\text{ion density} = 100 \times \frac{(\text{number of ionic monomers in mol})}{(\text{number of all monomers in this segment in mol})}$$

A calculation of the ion density of the three segments, on the basis of analytical data, is shown for illustration following the synthesis instructions for the preparation of polymer 3.

Segments A and C are defined by the chain start and the chain end, respectively, and also by the points in time during the polymerization at which the supply of one or more new monomer mixtures or of a new monomer into the reaction vessel is commenced, while segment B is defined only by the points in time during the polymerization at which the supply of one or more new monomer mixtures or of a new monomer to the reaction vessel is commenced. In this case, the three segments possess different ion densities. If one segment is prepared by supplying two or more monomer mixtures, one monomer mixture and one monomer or two monomers independently of one another, then the supplying is commenced simultaneously but can differ in length. This is illustrated in the examples in the context of the polymerization of the 3rd segment of polymers 3 and 4.

In one advantageous embodiment, therefore, the copolymers of the invention are prepared such that the polymerization of the second segment onto the first segment takes place in such a way that for the first segment and for the unreacted monomers of the first segment, the monomer mixture or the monomer which differs from the monomer or monomer mixture of the first segment at least in the amount of ionic monomers or ionic monomer precursors employed is supplied to the polymerization in such a way that a progressive transition in ion density is obtained within the second segment by way of the rate of supply and/or the differences in reaction rate, characterized by their different copolymerization parameters, of the monomers in the monomer or monomer mixture supplied.

It is particularly advantageous for the operation of preparing the copolymers of the invention to take place in such a way that for the prepolymer formed from first and second segment and for the unreacted monomers of the second and, where appropriate, first segment, the monomer mixture or the monomer which differs from the monomer or monomer mixture of the second segment at least in the amount of ionic monomers or ionic monomer precursors employed is supplied to the polymerization in such a way that a progressive transition in ion density is obtained within the third segment by way of the rate of supply and/or the differences in reaction rate, characterized by their different copolymerization parameters, of the monomers in the monomer or monomer mixture supplied.

The structural differentiation of the polymer into three segments, and the structural differentiation of the segments themselves, makes it possible to tailor the properties of the copolymers of the invention more effectively to their desired palette of properties as wetting agents and dispersants, in comparison to an AB block copolymer or a gradient copolymer of the kind described for example in EP-A-1416019.

Copolymers of the invention are understood to be copolymers characterized by a transition in ion density along the polymer chain, thereby defining the three segments. In the context of the aforementioned living, controlled polymerization processes, this transition in ion density or monomer composition can be achieved by means of sequential addition of the monomers or monomer mixtures. By virtue of the fact that, in the synthesis of the polymer segments, polymerization is not carried out to a degree of conversion of 100 mol %, but instead to a degree of conversion of the monomers of 10% to 95%, preferably of 20% to 95%, more preferably of 50% to 90%, is realised, and that subsequently, through the addition of the next monomer mixture or next monomer, respectively, the synthesis of the next polymer segment is commenced, a progressive transition develops in the composition of the polymer in each polymer segment.

The difference between the polymer segments is characterized, furthermore, in that they contain a different proportion of ionic monomers to the nonionic monomers, it being necessary for each polymer segment to include at least one ionic monomer. The fraction of the ionic monomers in a segment varies preferably from 1 to 100 mol %, based on the total number of the monomers in the segment, and can be adapted to the particular requirements of the application.

In this context the polymer segment having the highest concentration of ionic monomers contains only ethylenically unsaturated monomers having ionic groups, or a mixture comprising ethylenically unsaturated monomers having ionic groups and ethylenically unsaturated monomers having nonionic groups. The polymer segments with the lower concentrations of ionic groups are characterized by mixtures of ethylenically unsaturated monomers having ionic groups and ethylenically unsaturated monomers having nonionic groups. All three segments contain different concentrations of ionic groups.

The copolymers of the invention for use as dispersants preferably possess a number-average molecular weight $M_n$ of 1000 to 20 000 g/mol, more preferably 2000 to 20 000 g/mol and very preferably 2000 to 15 000 g/mol.

Each of the three segments possesses at least a number-averaged molecular weight of 300 g/mol.

Ionic groups are groups which are anionic or cationic or respectively which carry, formally, a negative or positive charge. In this context it is also possible for there to be two or more ionic groups in an ethylenically unsaturated monomer, as for example in zwitterionic compounds or in betaines.

The ionic groups can be introduced in the form of a corresponding ionic ethylenically unsaturated monomer into the polymer, or generated subsequently by means of polymer-analogous reactions, such as salt formation or quaternization of tertiary amino compounds, for example.

Thus it is possible for example to react acid functions in the polymer, such as carboxylic acids and phosphoric esters, for example, with bases, and/or to react acid anhydrides, such as maleic anhydride, for example, with bases in the presence of OH-functional compounds such as water or monohydric alcohols or polyethers.

Oxirane structures in the polymer can be reacted with nucleophiles such as o-phosphoric acid and subsequently salified with bases to form ionic groups.

Hydroxyl functionalities in the polymer can be reacted with polyphosphoric acid to form phosphoric esters and subsequently salified with bases to form ionic groups.

Suitable bases are, for example, amines such as, for example, dimethylaminoethanol, diethanolamine, triethanolamine, 2-(dimethylamino)propan-1-ol, triethylamine, butylamine and dibutylamine, hydroxides, oxides, carbonates and hydrogen carbonates of metals from main groups 1 to 3 of the Periodic Table of the Elements, such as sodium hydroxide, potassium hydroxide, aluminium hydroxide and sodium hydrogen carbonate, for example.

As described for example in U.S. Pat. No. 6,111,054 it is also possible to perform the salification of amines attached to the polymer using carboxylic acids or phosphoric acids and their esters.

It is additionally possible to convert amines into quaternary ammonium salts in alkylation reactions with alkyl halides, such as benzyl chloride, for example, or with a combination of oxirane with carboxylic acid.

Tertiary amines can be converted into amine oxides using oxygen, peroxo compounds such as percarboxylic acids, and using hydrogen peroxide, and these amine oxides can additionally be salified with acids such as hydrochloric acid, for example.

Examples of ionic, ethylenically unsaturated monomers can be taken from the list which follows, the (meth)acrylate notation including not only acrylates but also methacrylates: salts of acrylic acid, methacrylic acid or maleic acid; quaternary aminoalkyl (meth)acrylates, such as, for example, 2-trimethylammonioethyl methacrylate chloride and 2-benzyldimethylammonioethyl (meth)acrylate chloride; salts of phosphoric acid-containing monomers, such as sodium tripropylene glycol methacrylate phosphate, for example.

Examples of nonionic, ethylenically unsaturated monomers can be taken from the list below, the (meth)acrylate notation including not only acrylate but also methacrylate: (meth)acrylic esters, such as alkyl (meth)acrylates of linear, branched or cycloaliphatic alcohols having 1 to 22 carbon atoms, such as methyl (meth)acrylate, ethyl (meth)acrylate, n-butyl (meth)acrylate, isobutyl (meth)acrylate, tert-butyl (meth)acrylate, lauryl (meth)acrylate, 2-ethylhexyl (meth) acrylate, stearyl (meth)acrylate, cyclohexyl (meth)acrylate and isobornyl (meth)acrylate, for example, aryl (meth)acrylate, such as benzyl methacrylate or phenyl acrylate, it being possible for the aryl radicals in each case to be unsubstituted or substituted up to four times, such as 4-methylphenyl methacrylate, for example, hydroxyalkyl (meth)acrylates of linear, branched or cycloaliphatic diols having 3 to 36 carbon atoms, such as 3,4-dihydroxybutyl monomethacrylate, 4-hydroxybutyl (meth)acrylate, and 2,5-dimethyl-1,6-hexanediol monomethacrylate, for example, caprolactone-modified and/or valerolactone-modified hydroxyalkyl (meth)acrylates having an average molecular weight $M_n$ of 220 to 1200, the hydroxy (meth)acrylates being derived preferably from linear, branched or cycloaliphatic diols having 2 to 8 carbon atoms, or mono(meth)acrylates of polypropylene glycols having 10 to 80 carbon atoms, (meth)acrylates of halogenated alcohols, such as perfluoroalkyl (meth)acrylates having 6 to 20 carbon atoms, for example; oxiranyl (meth)acrylates, such as 2,3-epoxybutyl methacrylate, 3,4-epoxybutyl methacrylate and glycidyl (meth)acrylate, for example, 2-hydroxyethyl (meth)acrylate and mono(meth)acrylates of polyethylene glycols having 10 to 80 carbon atoms; aminoalkyl (meth) acrylates, such as N,N-dimethylaminoethyl (meth)acrylate and N,N-dimethylaminopropyl (meth)acrylate, for example; styrene and styrene derivatives, such as 4-methylstyrene, 4-vinylbenzoic acid and sodium 4-vinylbenzenesulphonate, for example; methacrylonitrile and acrylonitrile; vinyl esters of carboxylic acids having in particular 1 to 20 carbon atoms, such as vinyl acetate, for example; maleimide, and N-substituted maleimides such as N-phenylmaleimide or N-substituted maleimides with linear, branched or cycloaliphatic alkyl groups having 1 to 22 carbon atoms, such as N-ethylmaleimide and N-octylmaleimide, for example.

Nitrogen- or sulphur-containing heterocycles having ethylenically unsaturated units, such as 4-vinylpyridine and 1-[2-(methacryloyloxy)ethyl]-2-imidazolidinone, for example; (meth)acrylamide; N-alkyl- and N,N-dialkyl-substituted acrylamides with linear, branched or cycloaliphatic alkyl groups having 1 to 22 carbon atoms, such as N-(tert-butyl)acrylamide and N,N-dimethylacrylamide, for example.

The present invention further provides a process for preparing copolymers comprising three segments of different ion density, the fraction of the ionic monomers in each segment being from 1 to 100 mol %, each segment containing at least one ionic monomer, the second and third segment containing monomers of the respectively preceding segment, and the copolymers being preparable by means of a monofunctional initiator by way of NMP or RAFT, wherein the polymerization of the first segment takes place up to a degree of conversion of 10 to 95 mol % of the monomer or monomer mixture employed, the polymerization of the second segment onto the first segment takes place with inclusion of the unreacted monomers of the first segment and of a monomer or monomer mixture which differs from the monomer or monomer mixture of the first segment at least in the amount of ionic monomers or ionic monomer precursors employed, the polymerization of the second segment taking place up to a degree of conversion of 10 to 95 mol % of the monomers available for reaction, and the polymerization of the third segment onto the second segment takes place with inclusion of the unreacted monomers of the second segment and, where appropriate, first segment and of a monomer or monomer mixture which differs from the monomer or monomer mixture of the second segment at least in the amount of ionic monomers or ionic monomer precursors employed, and the ionic monomer precursors, where used, are converted wholly or partly into ionic monomers.

Further preferred embodiments of the process of the invention are apparent from the process features stated in order to characterize the copolymer of the invention, and some of them are also protected in Claims 10 to 13.

The monofunctional initiators used for preparing the copolymers of the invention initiate a polymer chain with only one direction of propagation. The monofunctional initiators used in the respective living controlled polymerization process are known to a person of ordinary skill in the art. Initiators which can be used include, for example, azo initiators such as azodiisobutyronitrile, peroxide compounds, such as dibenzoyl peroxide and dicumyl peroxide, and persulphates such as potassium peroxodisulphate.

Examples of polymerization regulators are set out in the literature cited above; for NMP, for example, 2,2,6,6-tetramethylpiperidineoxyl (TEMPO) or N-tert-butyl-N-[1-diethylphosphono(2,2-dimethylpropyl)]nitroxyl, and for RAFT, for example, thiocarboxylic esters or xanthogenic esters, are suitable.

In the case of NMP it is possible, furthermore, to use adducts of the initiator with the polymerization regulator, as described for example in Chem. Rev. 2001, 101, 3661, "V. Approaches to Alkoxyamines", or in Angewandte Chemie Int. Ed. 2004, 43, 6186.

The polymerization may take place solventlessly, in bulk, or in organic solvents and/or water. When solvents are used the polymerization can be carried out as a conventional solution polymerization, with the polymer in solution in the solvent, or as an emulsion or miniemulsion polymerization, as described for example in Angewandte Chemie Int. Ed. 2004, 43, 6186 and Macromolecules 2004, 37, 4453. The resulting emulsion polymer or miniemulsion polymer can be made water-soluble by salt formation, so that a homogeneous polymer solution is formed. It is possible for the polymers still to be water-insoluble after salification.

The copolymers obtained are not automatically defined by way of the polymerization regulator as end group. After the polymerization, for example, the end group may be fully or partly eliminated. Thus it is possible, for example, to eliminate the nitroxyl end group of the polymers prepared by NMP by thermal means, by raising the temperature beyond the polymerization temperature. This elimination of the polymerization regulator may also take place, for example, by addition of further chemical compounds such as polymerization inhibitors, phenol derivatives for example, or by a process as described in Macromolecules 2001, 34, 3856.

The RAFT regulator can be eliminated thermally by raising the temperature of the polymer, removed by adding oxidizing agents such as hydrogen peroxide, peracids, ozone or other bleaches from the polymer, or reacted with nucleophiles such as amines to form a thiol end group.

After polymerization has taken place, the copolymers can be modified subsequently in polymer-analogous reactions. Hydroxyl functionalities in the polymer, for example, can be reacted with lactones such as ε-caprolactone, for example, to form polyesters. In this case it is also possible as mentioned above to generate the ionic groups in the polymer.

The copolymers of the invention can be used in accordance with the invention as dispersants, for dispersing pigments, for example. The pigment dispersions comprising the copolymers of the invention as dispersants can be employed in a host of applications. One inventive use consists, for example, in the dispersing of pigments in organic solvents and/or water, where appropriate in the presence of binders and conventional coating auxiliaries.

Thus the copolymers of the invention can be used in accordance with the invention in the preparation for example of coating materials, especially pigmented coating materials, such as paints, pastes and/or moulding compounds, for example. Dispersants of this kind can be used for example for the preparation of pigments paints, in which case a film-forming binder and/or solvents and also solids, i.e. pigments and, where appropriate, customary auxiliaries, are mixed. Film-forming binders here are macromolecular or macromolecular-forming substances which are responsible for film formation. Those suitable include, for example, 2-component reactive varnishes, air-drying varnishes, moisture-curing varnishes, acid-curing varnishes, radiation-curing varnishes, dispersion varnishes or baking varnishes. Mention may be made by way of example of vinyl ester resins, alkyd resins, polyester resins, polyurethane resins, unsaturated polyester resins, polyester/polyisocyanate combinations, acrylic resins, epoxy resins, epoxy resin esters, ethylene-vinyl acetate polymers, melamine-formaldehyde resins, phenol-formaldehyde resins, polymethyl methacrylate, polypropylene, polyethylene, polyamides, polystyrene, polyurethane, polyvinyl acetate, polyvinyl butyrate, polyvinyl chloride, polyvinylidene chloride, polyvinylidene fluoride, polyvinyl fluoride, chlorinated rubber, cyclorubber, silicone polymers, urea-formaldehyde resins, vinyl chloride-vinyl acetate polymers, polybutadiene, etc., and also blends of the aforementioned substances. Within the binders it is also possible for there to be crosslinking monomers having at least two non-conjugated ethylenically unsaturated double bonds. Examples of such are divinylbenzene, alkylene glycol di(meth)acrylates, such as ethylene glycol diacrylate, 1,3-propylene glycol diacrylate, 1,2-propylene glycol dimethacrylate, and also allyl (meth)acrylate, diallyl maleate, triallylcyanuric acid or triallylisocyanuric acid. Also in accordance with the invention, therefore, is the use of the copolymers of the invention for preparing coating materials, in which case a binder, one or more organic solvents and/or water, pigments, the dispersant and, where appropriate, further, conventional coating auxiliaries are dispersed together.

The present invention also provides for the use of the copolymers of the invention as dispersants in the preparation of pigmented moulding compounds and pigmented coating materials and/or pigmented coatings on substrates, in which case the pigmented paint is applied to the substrate and in which case the pigmented paint applied to the substrate is baked or cured and/or crosslinked. The dispersants can be used in this case alone or together with binders having no functional attachment.

One inventive use of the ionic copolymers as dispersants may also lie in the preparation of dispersible pigments coated with the dispersant. Coatings on pigments of this kind can be carried out for example as described in EP-A-0270126.

Further examples of the use of pigment dispersions are given in WO 00/40630.

The dispersants can be used for dispersing organic pigments, such as azo condensates and diazo condensates and their metal complexes, phthalocyanines, quinacridones, indoles, thioindoles, perylenes, anthraquinones, anthrapyrimidines, diketopyrrolopyrroles and carbazoles. Further examples of pigments are found in the following monograph: W. Herbst, K. Hunger, "Industrial Organic Pigments", 1997 (publisher: Wiley-VCH, ISBN: 3-527-28836-8).

In addition it is possible to disperse inorganic pigments, such as iron(III) oxide, chromium(III) oxide, molybdenum sulphide, cadmium sulphide, carbon black, graphite, bismuth vanadate, lead chromate or lead molybdate, for example.

The choice of the ionic groups and of the ethylenically unsaturated monomers is guided by the pigment to be dispersed and also by the liquid medium and the binder, and may differ from one case to another. The monomers can be selected for example such that they interact with the material to be dispersed. Frequently these monomers are selected for example from the group consisting of aminoalkyl (meth)acrylates whose amine functionality has either been salified with acids or reacted with alkylating agents to form quaternary ammonium groups.

Further provided by the present invention are paints, pastes and moulding compounds comprising the copolymer of the invention and one or more pigments, organic solvents and/or water, and also, where appropriate, binders and conventional coating auxiliaries. Pigments coated with the copolymer of the invention are additionally provided by the invention.

EXAMPLES

Synthesis of the Polymers

Polymer 1

48 g of 2-methoxypropanol, 3.7 g of SG1 (i.e. N-tert-butyl-N-[1-diethylphosphono(2,2-dimethylpropyl)]nitroxyl; for preparation see Macromolecules 2000, 33, 1141), 1.3 g of 2,2'-azobis(isobutyronitrile), 8 g of 2-hydroxyethyl methacrylate (61.5 mmol), 39.32 g of n-butyl acrylate (307 mmol), 17.3 g of 2-(N,N-dimethylamino)ethyl methacrylate (112 mmol) and 18.4 g of styrene (177 mmol) are reacted at 120° C. under an inert gas atmosphere (nitrogen) in a reaction vessel until a conversion of 95% (measured by $^1$H-NMR) has been reached.

Subsequently 21.5 g of styrene (207 mmol) and 64.7 g of n-butyl acrylate (505 mmol) are added in 10 seconds and a mixture of 24 g of 2-hydroxyethyl methacrylate (185 mmol) and 36 g of 2-methoxypropanol is added at 120° C. over a period of 180 minutes. After the end of the metering a conversion of 94% (measured by $^1$H-NMR) has been reached and the reaction is terminated by cooling to room temperature. The polymer solution is adjusted with 2-methoxypropanol to a solids content of 50%.

Wetting Agent/Dispersant 1 (WA/D 1) (Comparison Polymer: AB Block Copolymer with an Ionic Block)

Formation of Ionic Groups:

120 g of the solution of polymer 1 are reacted with 4.0 g of benzoic acid and 7.25 g of tert-butylphenyl glycidyl ether at 120° C. for 2 hours. The polymer solution is adjusted with 2-methoxypropanol to a solids content of 50%.

Polymer 2

48 g of 2-methoxypropanol, 3.7 g of SG1 (i.e. N-tert-butyl-N-[1-diethylphosphono(2,2-dimethylpropyl)]nitroxyl; for preparation see Macromolecules 2000, 33, 1141), 1.3 g of 2,2'-azobis(isobutyronitrile), 104 g of n-butyl acrylate and 39.9 g of styrene are reacted at 120° C. under an inert gas atmosphere (nitrogen) in a reaction vessel and during the reaction 17.3 g of 2-(N,N-dimethylamino)ethyl methacrylate and 32 g of 2-hydroxyethyl methacrylate (185 mmol) in 36 g of 2-methoxypropanol are added over a period of 300 minutes. After the end of the metering a conversion of 93% (measured by $^1$H-NMR) has been reached and the reaction is terminated by cooling to room temperature. The polymer solution is adjusted with 2-methoxypropanol to a solids content of 50%.

Wetting Agent/Dispersant 2 (WA/D 2) (Comparison Polymer: Gradient Copolymer)

Formation of Ionic Groups:

120 g of the solution of polymer 2 are reacted with 4.0 g of benzoic acid and 7.25 g of tert-butylphenyl glycidyl ether at 120° C. for 2 hours. The polymer solution is adjusted with 2-methoxypropanol to a solids content of 50%.

Polymer 3

48 g of 2-methoxypropanol, 3.7 g of SG1, 1.3 g of 2,2'-azobis(isobutyronitrile), 39.32 g of n-butyl acrylate (307 mmol) and 6.6 g of 2-(N,N-dimethylamino)ethyl methacrylate (42 mmol) are heated to 120° C. under an inert gas atmosphere (nitrogen) in a reaction vessel. 15 minutes after the reaction temperature of 120° C. has been reached a degree of conversion of 90% for 2-(N,N-dimethylamino)ethyl methacrylate and 29% for n-butyl acrylate is reached (measured by GC). Subsequently a mixture of 8 g of 2-hydroxyethyl methacrylate (61.5 mmol), 11.0 g of 2-(N,N-dimethylamino)ethyl methacrylate (70 mmol) and 18.4 g of styrene (177 mmol) is metered in over a period of 30 minutes. After about 4 hours a conversion of 95% for 2-(N,N-dimethylamino)ethyl methacrylate and styrene, 99% for 2-hydroxyethyl methacrylate and 90% for n-butyl acrylate has been reached (measured by GC). Thereafter 21.5 g of styrene (207 mmol) and 64.7 g of n-butyl acrylate (505 mmol) are added over 1 minute and a mixture of 24 g of 2-hydroxyethyl methacrylate (185 mmol), 1.5 g of 2-(N,N-dimethylamino)ethyl methacrylate (9.5 mmol) and 36 g of 2-methoxypropanol is metered in at 120° C. over a period of 180 minutes. After the end of the metering a conversion of 96% (measured by $^1$H-NMR) has been reached and the reaction is terminated by cooling to room temperature. The polymer solution is adjusted with 2-methoxypropanol to a solids content of 50%.

Wetting Agent/Dispersant 3 (WA/D 3) (Ion Density in Mol %: $1^{st}$ Segment 30%, $2^{nd}$ Segment 14% and $3^{rd}$ Segment 1%)

Formation of Ionic Groups:

120 g of the solution of polymer 3 are reacted with 4.3 g of benzoic acid and 7.9 g of tert-butylphenyl glycidyl ether at 120° C. for 2 hours. The polymer solution is adjusted with 2-methoxypropanol to a solids content of 50%.

Calculation of Ion Density:

| | Degree of conversion | | |
|---|---|---|---|
| | mol employed | mol polymerized | mol unpolymerized |
| $1^{st}$ Segment | | | |
| BA | 307 | 89 | 218 |
| DMAEMA | 42 | 38 | 4 |
| $2^{nd}$ Segment | | | |
| BA | 307 | 276 − 89 = 187 | 31 |
| DMAEMA | 42 + 70 = 112 | 106 − 38 = 68 | 6 |
| HEMA | 61.5 | 61 | 0.5 |
| S | 177 | 168 | 9 |
| $3^{rd}$ Segment | | | |
| BA | 307 + 505 = 812 | 505 + 31 = 536 | |
| DMAEMA | 112 + 9.5 = 121.5 | 9.5 | |
| HEMA | 61.5 + 185 = 246.5 | 185 + 0.5 = 185.5 | |
| S | 177 + 207 = 384 | 207 + 9 = 216 | |
| $1^{st}$ Segment | 38/(38 + 89) | | = 30 mol % |
| $2^{nd}$ Segment | 68/(187 + 68 + 61 + 168) | | = 14 mol % |
| $3^{rd}$ Segment | 9.5/(536 + 9.5 + 185.5 + 216) | | = 1 mol % |

Polymer 4

48 g of 2-methoxypropanol, 3.7 g of SG1, 1.3 g of 2,2'-azobis(isobutyronitrile), 39.32 g of n-butyl acrylate (307 mmol) and 6.6 g of 2-(N,N-dimethylamino)ethyl methacrylate (42 mmol) are heated to 120° C. under an inert gas atmosphere (nitrogen) in a reaction vessel. 15 minutes after the reaction temperature of 120° C. has been reached a degree of conversion of 90% for 2-(N,N-dimethylamino)ethyl methacrylate and 29% for n-butyl acrylate is reached (measured by GC). Subsequently a mixture of 8 g of 2-hydroxyethyl methacrylate (61.5 mmol), 11.0 g of 2-(N,N-dimethylamino)ethyl methacrylate (70 mmol) and 18.4 g of styrene (177 mmol) is metered in over a period of 30 minutes. After about 4 hours a conversion of 95% for 2-(N,N-dimethylamino)ethyl methacrylate and styrene, 99% for 2-hydroxyethyl methacrylate and 90% for n-butyl acrylate has been reached (measured by GC). Thereafter 21.5 g of styrene (207 mmol) and 64.7 g of n-butyl acrylate (505 mmol) are added over 1 minute and a mixture of 24 g of 2-hydroxyethyl methacrylate (185 mmol), 6 g of 2-(N,N-dimethylamino)ethyl methacrylate (38 mmol) and 36 g of 2-methoxypropanol is metered in at 120° C. over a period of 180 minutes. After the end of the metering a conversion of 97% (measured by $^1$H-NMR) has been reached and the reaction is terminated by cooling to room temperature. The polymer solution is adjusted with 2-methoxypropanol to a solids content of 50%.

Wetting Agent/Dispersant 4 (WA/D 4) (Ion Density in Mol %: $1^{st}$ Segment 30%, $2^{nd}$ Segment 14% and $3^{rd}$ Segment 4%)

Formation of Ionic Groups:

120 g of the solution of polymer 4 are reacted with 5.3 g of benzoic acid and 9.8 g of tert-butylphenyl glycidyl ether at 120° C. for 2 hours. The polymer solution is adjusted with 2-methoxypropanol to a solids content of 50%.

Polymer 5

48 g of 2-methoxypropanol, 3.7 g of SG1, 1.3 g of 2,2'-azobis(isobutyronitrile), 47.32 g of n-butyl acrylate, 17.3 g of 2-(N,N-dimethylamino)ethyl methacrylate and 18.4 g of styrene are heated to 120° C. under an inert gas atmosphere (nitrogen) in a reaction vessel until a degree of conversion of 90% ($^1$H-NMR) has been reached. Subsequently a mixture of 89 g n-butyl acrylate and 21.5 g of styrene is added and it is polymerised until a degree of conversion of 98% ($^1$H-NMR) has been reached.

The polymer solution is adjusted with 2-methoxypropanol to a solids content of 50%.

Wetting Agent/Dispersant 5 (WA/D 5) (Comparison Polymer: AB Block Copolymer)

100 g of the solution of polymer 5 are reacted with 3.2 g of benzyl chloride at 120° C. for 4 hours. The polymer solution is adjusted with 2-methoxypropanol to a solids content of 40%.

Wetting Agent/Dispersant 6 (WA/D 6) (Comparison Polymer: AB Block Copolymer)

100 g of the solution of polymer 5 are reacted with 3.4 g of benzoic acid to form the benzoic acid salt solution of polymer 5. The polymer solution is adjusted with 2-methoxypropanol to a solids content of 50%.

Wetting Agent/Dispersant 7 (WA/D 7) (Comparison Polymer: AB Block Copolymer)

100 g of the solution of polymer 5 are reacted with 14.8 g of Disperbyk® 102 (polyether monophosphate, from Byk Chemie, Germany) to form a salt solution of the polymer. The polymer solution is adjusted with 2-methoxypropanol to a solids content of 50%.

Polymer 6

48 g of 2-methoxypropanol, 3.7 g of SG1, 1.3 g of 2,2'-azobis(isobutyronitrile), 39.32 g of n-butyl acrylate (307 mmol) and 6.6 g of 2-(N,N-dimethylamino)ethyl methacrylate (42 mmol) are heated to 120° C. under an inert gas atmosphere (nitrogen) in a reaction vessel. 15 minutes after the reaction temperature of 120° C. has been reached a degree of conversion of 31% (measured by $^1$H-NMR). Subsequently a mixture of 8 g of n-butyl acrylate (62.5 mmol), 11.0 g of 2-(N,N-dimethylamino)ethyl methacrylate (70 mmol) and 18.4 g of styrene (177 mmol) is metered in over a period of 30 minutes. After about 4 hours a conversion of 89% has been reached (measured by $^1$H-NMR). Thereafter 21.5 g of styrene (207 mmol) and 64.7 g of n-butyl acrylate (505 mmol) are added over 1 minute and a mixture of 24 g of n-butyl acrylate (187.5 mmol), 1.5 g of 2-(N,N-dimethylamino)ethyl methacrylate (9.5 mmol) and 36 g of 2-methoxypropanol is metered in at 120° C. over a period of 180 minutes. After the end of the metering a conversion of 96% (measured by $^1$H-NMR) has been reached and the reaction is terminated by cooling to room temperature. The polymer solution is adjusted with 2-methoxypropanol to a solids content of 50%.

Wetting Agent/Dispersant 8 (WA/D 8) (Polymer According to the Invention)

100 g of the solution of polymer 6 are reacted with 3.2 g of benzyl chloride at 120° C. for 4 hours. The polymer solution is adjusted with 2-methoxypropanol to a solids content of 40%.

Wetting Agent/Dispersant 9 (WA/D 9) (Polymer According to the Invention)

100 g of the solution of polymer 6 are reacted with 3.4 g of benzoic acid to form the benzoic acid salt solution of polymer 6. The polymer solution is adjusted with 2-methoxypropanol to a solids content of 50%.

Wetting Agent/Dispersant 10 (WA/D 10) (Polymer According to the Invention)

100 g of the solution of polymer 6 are reacted with 14.8 g of Disperbyk® 102 (polyether monophosphate, from Byk Chemie, Germany) to form a salt solution of the polymer. The polymer solution is adjusted with 2-methoxypropanol to a solids content of 50%.

Performance Testing

Pigment Concentrate

| | |
|---|---|
| 2-Methoxypropyl acetate | 51.8 |
| Starsol | 5.8 |
| WA/D 1 to 10 | 34.0 |
| Bayferrox 130 M | 204.0 |
| Aerosil R 972 | 4.5 |
| | 300.0 |

Dispersion: 40 min at 40° C. and 8000 rpm, Dispermat CV

Paint 1:

| | |
|---|---|
| Epikote 1001 (75% in xylene) | 60.0 |
| Xylene | 17.0 |
| 2-Methoxypropanol | 12.8 |
| n-Butanol | 10.0 |
| BYK-325 | 0.2 |
| | 100.0 |

Curing Agent:

| | |
|---|---|
| Versamid 115/70 | 71.0 |
| Xylene | 12.0 |
| 2-Methoxypropanol | 8.0 |
| n-Butanol | 9.0 |
| | 100.0 |

Paint 2:

| | |
|---|---|
| Joncryl 500 | 57.6 |
| Cymel 303 | 19.8 |
| MAK | 13.0 |
| n-Butanol | 8.0 |
| BYK-310 | 0.3 |
| Nacure 2500 | 1.3 |
| | 100.0 |

Starsol mixture of diesters from Haltermann
Bayferrox 130 M iron oxide pigment from Lanxess
Aerosil R 972 hydrophobic pyrogenic silica from Degussa
Epikote 1001 reaction product of bisphenol A with epichlorohydrin, from Shell
Joncryl 500 hydroxy-terminated polyacrylate binder, from Johnson
Cymel 303 melamin resin, binder, from Cytec
Nacure 2500 catalyst, from King Industries
MAK methyl amyl ketone
BYK-325 modified polysiloxane from Byk Chemie
BYK-310 modified polysiloxane from Byk Chemie
Versamid 115/70 amine-containing polyamide from Cognis Letdown and Curing of Paint 1

| | |
|---|---|
| Pigment concentrate | 2.6 |
| Paint 1 | 18.3 |
| Curing agent | 9.1 |
| | 30.0 |

The pigment concentrate is shaken with the paint for 5 minutes before the curing agent is added and shaking is continued for 5 minutes.

Following the application a rub-out test is carried out.

Drying: 24 h at room temperature.

The ΔE value is measured with Color-guide sphere d/8° spin from Byk Gardner.

Letdown and Curing of Paint 2

| | |
|---|---|
| Pigment concentrate | 3.6 |
| Paint 2 | 26.4 |
| | 30.0 |

The pigment concentrate is shaken with the paint for 5 minutes.

Following the application a rub-out test is carried out.

Drying: 10 min at room temperature, subsequently 30 min at 140° C.

The ΔE value is measured with Color-guide sphere d/8° spin from Byk Gardner.

Assessment of Paint Film 1

| | Viscosity of pigment concentrate | Specks | ΔE |
|---|---|---|---|
| WA/D 1 | it was not possible to prepare a pigment concentrate | | |
| WA/D 2 | low | no | 4.23 |
| WA/D 3 | low | no | 0.64 |
| WA/D 4 | low | no | 0.19 |

Assessment of Paint Film 2

| | Viscosity of pigment concentrate | Specks | ΔE |
|---|---|---|---|
| WA/D 5 | medium | no | 0.23 |
| WA/D 6 | medium | no | 0.18 |
| WA/D 7 | medium | no | 0.25 |
| WA/D 8 | low | no | 0.21 |
| WA/D 9 | low | no | 0.15 |
| WA/D 10 | low | no | 0.26 |

As a result of the inherent floating of the pigment, the rub-out test indicates the capacity of the wetting agent and dispersant to stabilize the pigment dispersion. In this context it is the case that, the smaller the ΔE figure, the better the stabilization by the wetting agent and dispersant of the pigment particles in the paint.

Since it was not possible to produce a liquid pigment concentrate with the comparative example WA/D 1 this polymer exhibits far poorer wetting and/or dispersing properties than the inventive WA/D 3 and 4, which in turn stabilize the pigment more effectively than comparative example WA/D 2.

In the second testing system a low-viscosity pigment concentrate is obtained due to the use of triblock copolymers (WA/D 8, 9 and 10) compared to the use of diblock copolymers (WA/D 5, 6 and 7). The low viscosity can be employed advantageousely in systems with increased pigment concentrations. As a result solvent can be saved.

The invention claimed is:

1. A copolymer comprising three segments of different ion density, the fraction of the ionic monomers in each segment being from 1 to 100 mol %, the second and third segment containing ethylenically unsaturated monomers of the respective preceding segment, and the copolymers being the result of an NMP or RAFT polymerization with a monofunctional initiator, wherein the polymerization of the first segment takes place up to a degree of conversion of 10 to 95 mol % of the monomer or monomer mixture employed, the polymerization of the second segment onto the first segment takes place with inclusion into the second segment of the unreacted monomers of the first segment and with inclusion of a monomer or monomer mixture which differs from the monomer or monomer mixture of the first segment at least in the amount of ionic monomers or ionic monomer precursors employed, the polymerization of the second segment taking place up to a degree of conversion of 10 to 95 mol % of the monomers available for reaction, and the polymerization of the third segment onto the second segment takes place with inclusion into the third segment of the unreacted monomers of the second segment and, where appropriate, of unreacted monomers of the first segment and with inclusion of a monomer or monomer mixture which differs from the monomer or monomer mixture of the second segment at least in the amount of ionic monomers or ionic monomer precursors employed, and the ionic monomer precursors, where used, are converted wholly or partly into ionic monomers.

2. A copolymer according to claim 1, wherein the polymerization of the second segment onto the first segment takes place in such a way that for the first segment and for the unreacted monomers of the first segment, the monomer mixture or the monomer which differs from the monomer or monomer mixture of the first segment at least in the amount of ionic monomers or ionic monomer precursors employed is supplied to the polymerization in such a way that a progressive transition in ion density is obtained within the second segment by way of the rate of supply and/or the differences in reaction rate of the monomers in the monomer or monomer mixture supplied.

3. A copolymer according to claim 1, wherein the polymerization of the third segment onto the second segment takes place in such a way that for the prepolymer formed from first and second segment and for the unreacted monomers of the second and, where appropriate, first segment, the monomer mixture or the monomer which differs from the monomer or monomer mixture of the second segment at least in the amount of ionic monomers or ionic monomer precursors employed is supplied to the polymerization in such a way that a progressive transition in ion density is obtained within the third segment by way of the rate of supply and/or the differences in reaction rate of the monomers in the monomer or monomer mixture supplied.

4. A copolymer according to claim 1, wherein the polymer segment having the highest concentration of ionic monomers contains only ethylenically unsaturated monomers having ionic groups or a mixture containing ethylenically unsaturated monomers having ionic groups and ethylenically unsaturated monomers having nonionic groups, and the polymer segments having the lower concentrations of ionic groups are mixtures of ethylenically unsaturated monomers having ionic groups and ethylenically unsaturated nonionic groups, and wherein the nonionic ethylenically unsaturated monomers are selected from the group consisting of acrylic and methacrylic esters, styrene and its derivatives, vinyl esters of carboxylic acids, maleic anhydride and maleic acid, maleimide and its N-substituted derivatives, nitrogen- or sulphur-containing heterocycles with ethylenically unsaturated units, acrylamide and methacrylamide, N-alkyl- and N,N-dialkyl-substituted acrylamides and methacrylamides.

5. A copolymer according to claim 1, wherein the ionic monomers are ionic ethylenically unsaturated monomers selected from the group consisting of the salts of acrylic, methacrylic and maleic acid, quaternary aminoalkyl acrylates and methacrylates, and salts of monomers containing phosphoric acid.

6. A copolymer according to claim 1, wherein the ionic monomer precursors are precursors of ionic ethylenically unsaturated monomers are selected from the group consisting of acrylic, methacrylic and maleic acid, maleic anhydride, and ethylenically unsaturated monomers carrying oxirane or amino groups.

7. A copolymer according to claim 1, wherein the copolymers possess a number-average molecular weight $M_n$ of 1000 to 20 000 g/mol, preferably of 2000 to 20 000 g/mol, very preferably of 2000 to 15 000 g/mol.

8. A copolymer according to claim 1, wherein adjacent segments of different ion density differ in the fraction of ionic monomers by at least 2 mol %, preferably at least 4 mol %, more preferably at least 6 mol %.

9. A process for preparing a copolymers comprising three segments of different ion density, the fraction of the ionic monomers in each segment being from 1 to 100 mol %, each segment containing at least one non-ionic monomer and at least one ionic monomer, the second and third segment containing monomers of the respectively preceding segment, and the copolymers being prepared using a monofunctional initiator and an NMP or RAFT polymerization, wherein
 the polymerization of the first segment takes place up to a degree of conversion of 10 to 95 mol % of the monomer or monomer mixture employed,
 the polymerization of the second segment onto the first segment takes place with inclusion into the second segment of the unreacted monomers of the first segment and with inclusion of a monomer or monomer mixture which differs from the monomer or monomer mixture of the first segment at least in the amount of ionic monomers or ionic monomer precursors employed, the polymerization of the second segment taking place up to a degree of conversion of 10 to 95 mol % of the monomers available for reaction, and
 the polymerization of the third segment onto the second segment takes place with inclusion into the third segment of the unreacted monomers of the second segment and, where appropriate, first segment and with inclusion of a monomer or monomer mixture which differs from the monomer or monomer mixture of the second segment at least in the amount of ionic monomers or ionic monomer precursors employed,
 and the ionic monomer precursors, where used, are converted wholly or partly into ionic monomers.

10. A process according to claim 9, wherein the polymerization of the second segment onto the first segment takes place in such a way that for the first segment and for the unreacted monomers of the first segment, the monomer mixture or the monomer which differs from the monomer or monomer mixture of the first segment at least in the amount of ionic monomers or ionic monomer precursors employed is supplied to the polymerization in such a way that a progressive transition in ion density is obtained within the second segment by way of the rate of supply and/or the differences in reaction rate of the monomers in the monomer or monomer mixture supplied.

11. A process according to claim 9, wherein the polymerization of the third segment onto the second segment takes place in such a way that for the prepolymer formed from first and second segment and for the unreacted monomers of the second and, where appropriate, first segment, the monomer mixture or the monomer which differs from the monomer or monomer mixture of the second segment at least in the amount of ionic monomers or ionic monomer precursors employed is supplied to the polymerization in such a way that a progressive transition in ion density is obtained within the third segment by way of the rate of supply and/or the differences in reaction rate of the monomers in the monomer or monomer mixture supplied.

12. A process according to claim 9, wherein the polymerization regulator is cleaved from the polymer in a further step.

13. A process according to claim 9, wherein the copolymer obtained is modified in a further step in a polymer-analogous reaction.

14. A dispersant composition comprising a copolymer of claim 1.

15. A dispersant composition according to claim 14 further comprising solid particles wherein the monomeric units of the copolymer which interact with the solid particles to be dispersed are selected from the group consisting of aminoalkyl (meth)acrylates whose amine functionality has either been salified with acids or reacted with alkylating agents to form quaternary ammonium groups.

16. A dispersant composition according to claim 14 further comprising solid pigment particles wherein the pigment particles are dispersed in organic solvents and/or water, and where appropriate in the presence of binders and conventional coating auxiliaries.

17. A moulding compound or coating material comprising a copolymer according to claim 1.

18. A coating material comprising a copolymer according to claim 1 in a dispersed combination with a binder, one or more organic solvents and/or water, pigments, and any further, customary auxiliaries.

19. A paint, coating material, paste, and/or a moulding compound comprising one or more pigments and the copolymer from claim 1.

20. A paint, coating material, paste and/or moulding compound according to claim 19 further comprising organic solvents and/or water, where appropriate in the presence of binders and conventional coating auxiliaries.

21. A pigment coated with the copolymer of claim 1.

22. A copolymer according to claim 2, wherein the polymerization of the third segment onto the second segment takes place in such a way that for the prepolymer formed from first and second segment and for the unreacted monomers of the second and, where appropriate, first segment, the monomer mixture or the monomer which differs from the monomer or monomer mixture of the second segment at least in the amount of ionic monomers or ionic monomer precursors employed is supplied to the polymerization in such a way that a progressive transition in ion density is obtained within the third segment by way of the rate of supply and/or the differences in reaction rate of the monomers in the monomer or monomer mixture supplied.

23. A process according to claim 10, wherein the polymerization of the third segment onto the second segment takes place in such a way that for the prepolymer formed from first and second segment and for the unreacted monomers of the second and, where appropriate, first segment, the monomer mixture or the monomer which differs from the monomer or monomer mixture of the second segment at least in the amount of ionic monomers or ionic monomer precursors employed is supplied to the polymerization in such a way that a progressive transition in ion density is obtained within the third segment by way of the rate of supply and/or the differences in reaction rate of the monomers in the monomer or monomer mixture supplied.

* * * * *